US009616438B2

(12) United States Patent
Ulrich et al.

(10) Patent No.: US 9,616,438 B2
(45) Date of Patent: Apr. 11, 2017

(54) IMPELLER FOR ELECTROSTATIC SPRAY GUN

(71) Applicant: Graco Minnesota Inc., Minneapolis, MN (US)

(72) Inventors: Mark E. Ulrich, Oak Grove, MN (US); Jason J. Willoughby, Minneapolis, MN (US)

(73) Assignee: Graco Minnesota Inc., Minneapolis, MN (US)

(*) Notice: Subject to any disclaimer, the term of this patent is extended or adjusted under 35 U.S.C. 154(b) by 0 days.

(21) Appl. No.: 14/432,652

(22) PCT Filed: Sep. 30, 2013

(86) PCT No.: PCT/US2013/062665
§ 371 (c)(1),
(2) Date: Mar. 31, 2015

(87) PCT Pub. No.: WO2014/055424
PCT Pub. Date: Apr. 10, 2014

(65) Prior Publication Data

US 2015/0258557 A1 Sep. 17, 2015

Related U.S. Application Data

(60) Provisional application No. 61/751,006, filed on Jan. 10, 2013, provisional application No. 61/708,150, filed on Oct. 1, 2012.

(51) Int. Cl.
*H02K 9/00* (2006.01)
*B05B 5/025* (2006.01)
(Continued)

(52) U.S. Cl.
CPC ............ *B05B 5/025* (2013.01); *B05B 5/0532* (2013.01); *F01D 1/023* (2013.01); *F01D 1/026* (2013.01); *F01D 1/12* (2013.01); *F01D 15/10* (2013.01)

(58) Field of Classification Search
CPC ...................................................... F01D 15/10
(Continued)

(56) References Cited

U.S. PATENT DOCUMENTS 2,777,078 A 1/1957 Herchenbach
3,235,235 A 2/1966 Umbricht et al.
(Continued)

FOREIGN PATENT DOCUMENTS

CN 201661407 U 12/2010
DE 801025 7/1949
(Continued)

OTHER PUBLICATIONS

First Chinese Office Action, for Chinese Patent Application No. 201380051281.7, dated Jun. 3, 2016, 16 pages.
(Continued)

*Primary Examiner* — Hanh Nguyen
(74) *Attorney, Agent, or Firm* — Kinney & Lange, P.A.

(57) ABSTRACT

An alternator, such as for use in an electrostatic spray gun, comprises an electromagnetic alternator, a housing and an impeller. The electromagnetic alternator has a shaft. The electromagnetic alternator is disposed within the housing. The housing has an air aperture. The impeller is mounted to the shaft within the housing so as to be aligned with the air aperture. The impeller includes blades having curved leading and trailing edges. In one embodiment, each blade has a curvature so as to be perpendicular to the air aperture across an entire arc over which each impeller blade has a line of sight of the air aperture.

12 Claims, 6 Drawing Sheets

(51) Int. Cl.

| | |
|---|---|
| ***B05B 5/053*** | (2006.01) |
| ***F01D 1/02*** | (2006.01) |
| ***F01D 1/12*** | (2006.01) |
| ***F01D 15/10*** | (2006.01) |

(58) Field of Classification Search
USPC .......... 310/52, 54, 58, 59, 64, 60 R; 290/1 R
See application file for complete search history.

(56) References Cited

U.S. PATENT DOCUMENTS

| | | | | |
|---|---|---|---|---|
| 3,813,086 A | 5/1974 | Ebner et al. | | |
| 4,219,865 A | 8/1980 | Malcolm | | |
| 4,377,838 A | 3/1983 | Levey et al. | | |
| 4,491,276 A | 1/1985 | Reeves | | |
| 4,865,255 A | 9/1989 | Luvisotto | | |
| 5,209,650 A | 5/1993 | Lemieux | | |
| 5,559,379 A * | 9/1996 | Voss | F01D 17/14 | 290/1 R |
| 6,309,179 B1 | 10/2001 | Holden | | |
| 7,988,075 B2 | 8/2011 | Altenburger | | |
| 8,067,850 B2 * | 11/2011 | Alvarez | B82Y 15/00 | 290/54 |
| 2004/0195404 A1 | 10/2004 | Lunzer | | |
| 2008/0231056 A1 * | 9/2008 | Wen | F03B 13/00 | 290/54 |
| 2011/0237863 A1 | 9/2011 | Ricci et al. | | |
| 2012/0181345 A1 | 7/2012 | Mueller | | |

FOREIGN PATENT DOCUMENTS

| | | | |
|---|---|---|---|
| DE | 102010024475 | A1 | 12/2011 |
| FR | 495666 | | 2/1919 |
| JP | 2005246305 | A | 9/2005 |
| JP | 2010236505 | A | 10/2010 |

OTHER PUBLICATIONS

International Searching Authority, International Search Report and Written Opinion, Jan. 22, 2014, 12 pages.
Extended European Search Report, for European Patent Application No. 13843801.5, dated Jun. 9, 2016, 7 pages.
Second Chinese Office Action for Chinese Patent Application No. 201380051281.7, dated Feb. 20, 2017, 8 pages.

* cited by examiner

IMPELLER FOR ELECTROSTATIC SPRAY GUN

CROSS-REFERENCE TO RELATED APPLICATION(S)

This application claims benefit to International Application No. PCT/US2013/062665 filed Sep. 30, 2013 entitled "IMPELLER FOR ELECTROSTATIC SPRAY GUN" which claims benefit of Provisional Application No. 61/751,006, filed Jan. 10, 2013 entitled "AIR DRIVEN TURBINE", and claims benefit of Provisional Application No. 61/708,150, filed Oct. 1, 2012, entitled "AIR DRIVEN TURBINE" which are incorporated herein.

BACKGROUND

The present invention relates generally to applicators that are used to spray fluids, such as paint, sealants, coatings, enamels, adhesives, powders and the like. More particularly, the invention relates to electrostatic spray guns.

In electrostatic spray systems, an electrostatic field is produced in the vicinity between the spray gun and the target or article to be sprayed. The sprayed particles are propagated through this field, and the respective particles pick up electrical charges as they pass through the field. The charged particles are thereby attracted to the article to be sprayed. By this process, it is possible to direct a much higher percentage of sprayed particles to the actual article to be sprayed, and thereby the efficiency of spraying is vastly improved over conventional methods. Electrostatic spray guns are particularly useful for applying non-conductive liquids and powders, although they may be used in connection with spraying conductive liquids.

In a typical electrostatic spraying system, an ionizing electrode is placed in the vicinity of the spray gun spray orifice, the article to be painted is held at ground potential, and an electrostatic field is developed between the ionizing electrode and the article. The distance between the electrode and ground may be on the order of about 0.5 meters or less; therefore, the voltage applied to the spray gun electrode must necessarily be quite high in order to develop an electrostatic field of sufficient intensity to create a large number of ion/particle interactions so as to develop a sufficient attractive force between the paint particles and the target. It is not unusual to apply electrostatic voltages on the order of 20,000-100,000 volts (20-100 kV) to the spray gun electrode in order to achieve a proper degree of efficiency in the spraying operation. An ionizing current on the order of 50 micro-amps typically flows from the spray gun electrode.

Electrostatic spray guns may be hand-held spray guns or automatic spray guns operable by remote control connections. The sprayed fluid may be atomized using different primary atomizing forces, such as pressurized air, hydraulic forces, or centrifugal forces. Power for the electrostatic voltage may be generated in a variety of ways. In many systems, an external power source is connected to the electrostatic spray gun. However, in other designs, power may be generated with an alternator located in the electrostatic spray gun. For example, U.S. Pat. Nos. 4,554,622, 4,462,061, 4,290,091, 4,377,838, 4,491,276 and 7,226,004 describe electrostatic spray guns having an air-powered turbine which drives an alternator that in turn supplies a voltage multiplier to provide the charging voltage.

SUMMARY

An alternator, such as for use in an electrostatic spray gun, comprises an electromagnetic alternator, a housing and an impeller. The electromagnetic alternator has a shaft. The electromagnetic alternator is disposed within the housing. The housing has an air aperture. The impeller is mounted to the shaft within the housing so as to be aligned with the air aperture. The impeller includes blades having curved leading and trailing edges.

In another embodiment, an alternator assembly comprises a housing, an alternator, a shaft and an impeller. The housing has an inlet opening. The alternator is disposed in the housing. The alternator comprises a stator surrounding a rotor. The shaft extends from the rotor. The impeller comprises a hub mounted to the shaft, and a plurality of blades extending from the hub. Each blade has a curvature so as to be perpendicular to the inlet opening across an entire arc over which each blade has a line of sight of the inlet opening.

DETAILED DESCRIPTION

Figure 1:
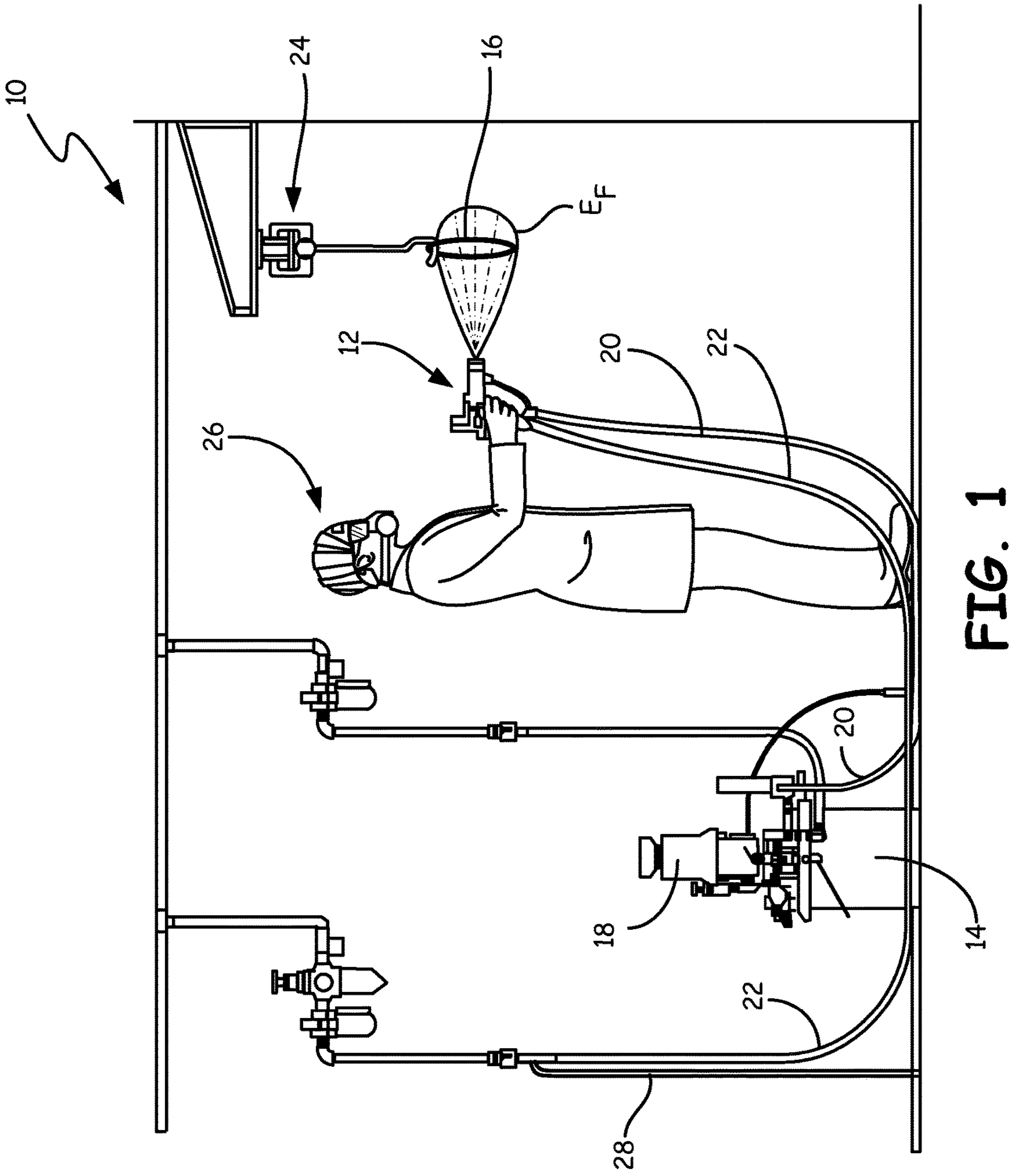
FIG. 1 is a schematic of an electrostatic spray system showing an electrostatic spray gun connected to a fluid supply and discharging onto a target.
Figure 2:
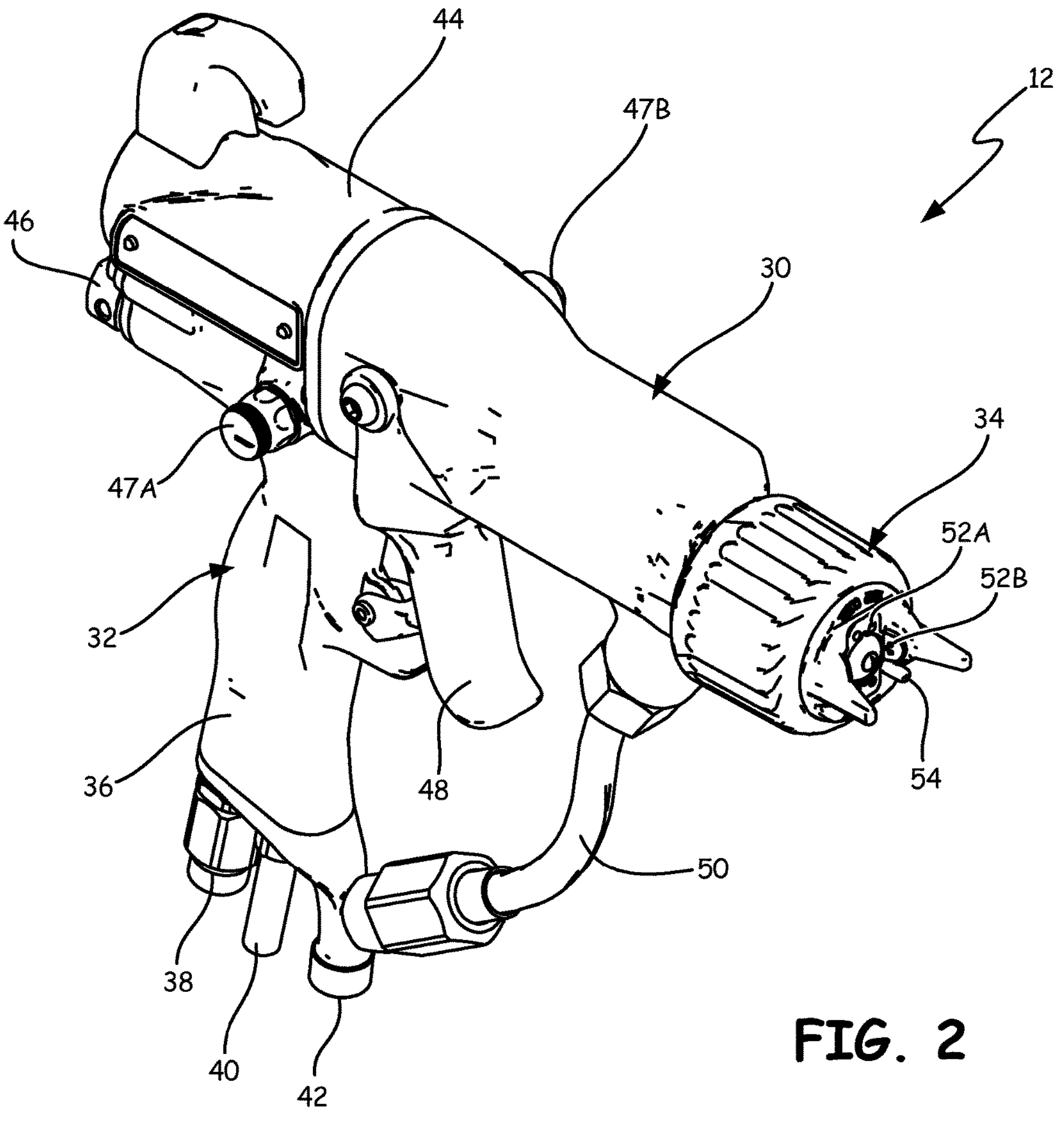
FIG. 2 is a perspective view of the electrostatic spray gun of FIG. 1 showing a gun barrel connected to a handle body and a spray tip assembly.
Figure 3:
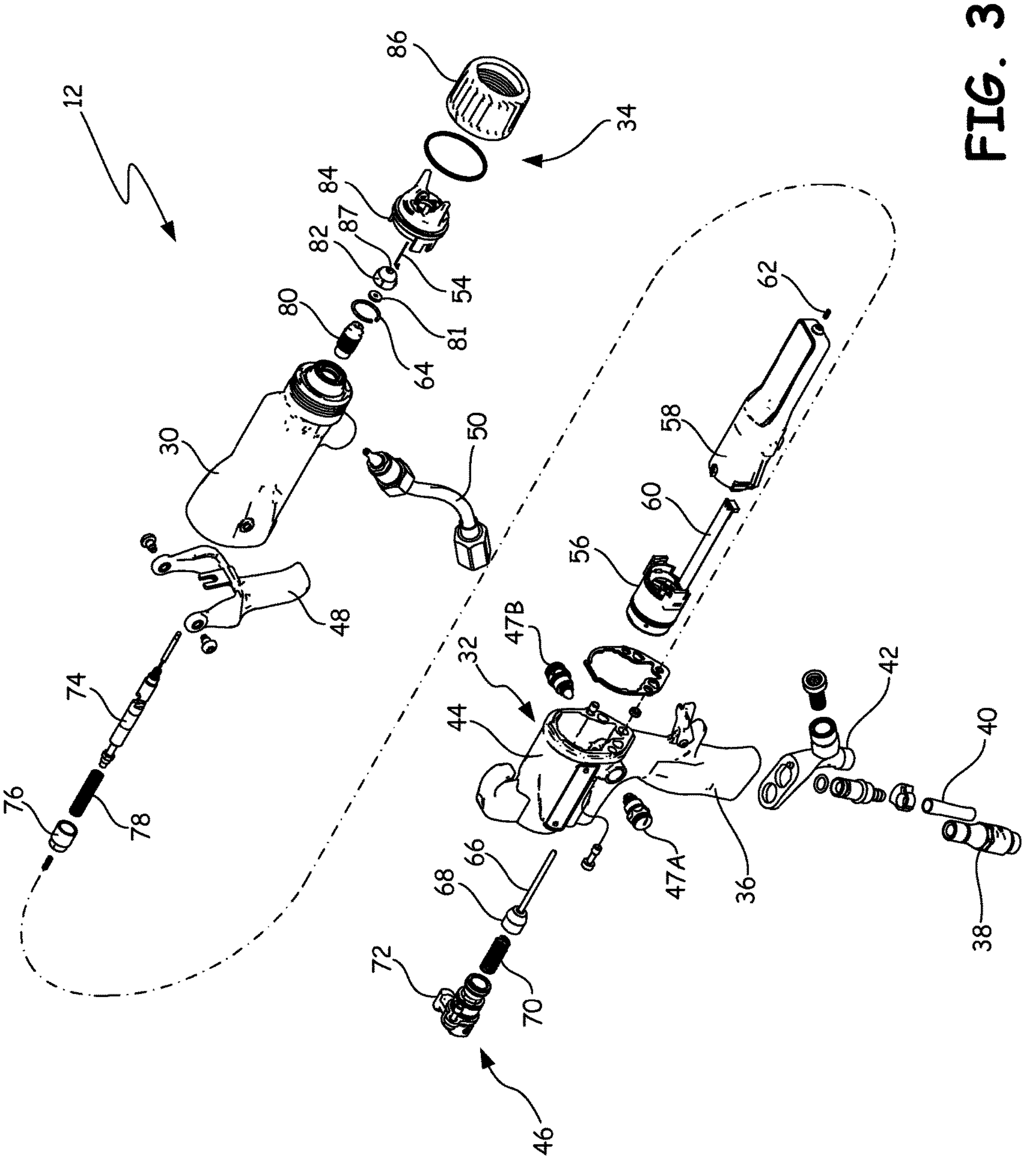
FIG. 3 is an exploded view of the electrostatic spray gun of FIG. 2 showing an alternator and a power supply configured to be located within the gun body.

In embodiments of the present invention, an electrostatic spray gun includes an alternator assembly having an impeller with curved blades. The electrostatic spray gun generates an internal power supply using an air-driven turbine that drives a rotor within a stator of an electromagnetic alternator. The impeller blades are curved to optimize reception of compressed air that impinges upon the blades to cause rotation. Specifically, the trailing edges of the blades are curved to be perpendicular to a jet of compressed air aimed at the blades from an alternator housing. FIGS. 1-3 of the present disclosure describe an electrostatic spray gun in which curved impeller blades may be used. FIGS. 4A-5B describe various aspects, embodiments and benefits of the support sheath.

FIG. 1 is a schematic of electrostatic spray system 10 showing electrostatic spray gun 12 connected to fluid supply 14 and discharging onto target 16. Pump 18 is coupled to fluid supply 14 and provides pressurized fluid to spray gun 12 via hose 20. Spray gun 12 is also connected to a source of pressurized air (not shown) via hose 22. Target 16 is connected to ground, such as by being suspended from rack 24. Electrostatic spray system 10 is described with reference to a fluid spraying system, but other coating materials may be used with the present invention, such as powders and the like. Although FIGS. 1-3 are described with specific reference to an air-assist system, the present invention may also be used with an air-spray system.

Operator 26 positions spray gun 12 in close proximity to target 16, approximately 0.5 meters or less. Upon actuation of a trigger on spray gun 12, pressurized air is supplied to a turbine within spray gun 12 that powers an alternator to generate electrical power. The electrical power is supplied to an electrode near the spray tip of spray gun 12. Thus, electrical field EF is produced between the electrode and target 16. Electrostatic spray system 10 is grounded at various points. For example, ground wire 28 and/or conductive air hose 22 may ground spray gun 12. Other grounding wires and conductive materials may be used throughout electrostatic spray system 10 to provide grounding. Simultaneously, actuation of the trigger allows pressurized fluid from pump 18 through the spray tip whereby atomized particles of the fluid become charged in electrical field EF. The charged particles are thus drawn to target 16, which is grounded. Target 16 is suspended via rack 24 and the electrically charged fluid particles wrap around target 16, thereby significantly reducing overspray.

FIG. 2 is a perspective view of electrostatic spray gun 12 of FIG. 1 showing gun barrel 30 connected to handle body 32 and spray tip assembly 34. Handle 36 of handle body 32 is connected to air inlet 38, air exhaust 40 and fluid inlet 42. Housing 44 of handle body 32 is connected to gun barrel 30. Air control 46 is connected to an on/off valve (see air needle 66 in FIG. 3) within housing 44 and controls flow of compressed air from air inlet 38 to the components of spray gun 12. Air adjusters 47A and 47B control the flow of air from the aforementioned on/off valve to spray tip assembly 34. Trigger 48 is connected to a fluid valve (see fluid needle 74 in FIG. 3) within gun barrel 30 and is configured to control flow of pressurized fluid from fluid inlet 42 through spray tip assembly 34 via fluid tube 50. Air control 46 controls the flow of air to the alternator. The air then exits spray gun 12 at exhaust 40.

Actuation of trigger 48 simultaneously allows compressed air and pressurized fluid to spray tip assembly 34. Some of the compressed air is used to influence the flow of fluid from spray tip assembly 34 and thereby exits spray gun 12 at ports 52A and 52B, or other such ports. In air-spray systems, some of the compressed air is also used to directly atomize the fluid as it exits the spray orifice. In both air-spray and air-assist systems, some of the compressed air is also used to rotate an alternator that provides power to electrode 54 and leaves spray gun 12 at exhaust 40. The alternator and an associated power supply for electrode 54 are shown in FIG. 3.

FIG. 3 is an exploded view of electrostatic spray gun 12 of FIG. 2 showing alternator 56 and power supply 58 configured to be located within handle body 32 and gun barrel 30. Alternator 56 is connected to power supply 58 via ribbon cable 60. Alternator 56 couples to power supply 58 and, when assembled, alternator 56 fits into housing 44 and power supply 58 fits into gun barrel 30. Electricity generated by alternator 56 is transmitted to power supply 58. In air-assist systems, an electric circuit, including spring 62 and conductive ring 64, conveys the electric charge from power supply 58 to electrode 54 inside of spray tip assembly 34. Air-spray systems may have other electric circuits connecting the alternator to the electrode.

Air needle 66 and seal 68 comprise an on/off valve for control of compressed air through spray gun 12. Air control valve 46 includes air needle 66 that extends through housing 44 to trigger 48, which can be actuated to move seal 68 and control flow of compressed air from air inlet 38 through passages within handle body 32. Spring 70 biases seal 68 and trigger 48 to a closed position, while knob 72 may be adjusted to manipulate valve 46. With seal 68 opened, air from inlet 38 flows through the passages within handle body 32 to alternator 56 or spray tip assembly 34.

Fluid needle 74 comprises part of a fluid valve for control of pressurized fluid through spray gun 12. Actuation of trigger 48 also directly moves fluid needle 74, which is coupled to trigger 48 via cap 76. Spring 78 is positioned between cap 76 and trigger 48 to bias needle 74 to a closed position. Needle 74 extends through gun barrel 30 to spray tip assembly 34.

Spray tip assembly 34 includes seat housing 80, gasket 81, tip 82, air cap 84 and retainer ring 86. In air-assist systems, fluid needle 74 engages seat housing 80 to control flow of pressurized fluid from fluid tube 50 through to spray tip assembly 34. Gasket 81 seals between seat housing 80 and tip 82. Tip 82 includes spray orifice 87 that discharges pressurized fluid from seat housing 80. Electrode 54 extends from air cap 84. In air-assist systems, high pressure fluid is fed through spray orifice 87, from which electrode 54 is offset. Atomization occurs by passing the high pressure fluid through a small orifice. In air-spray systems, an electrode extends from a spray orifice such that the electrode and spray orifice are concentric. Low pressure fluid passes through a large spray orifice, and is atomized by impinging airflow from air cap 34. In either systems, air cap 84 includes ports, such as ports 52A and 52B (FIG. 2), that receive pressurized air to atomize and shape the flow of fluid from tip 82 based on setting of adjusters 47A and 47B. In other embodiments, gun 12 may operate without either of ports 52A and 52B, or may operate with only one of ports 52A and 52B.

Operation of alternator 56 under force of pressurized air provides electrical energy to power supply 58 that in turn applies a voltage to electrode 54. Electrode 54 generates electrical field EF (FIG. 1) that applies a charge to atomized fluid originating from tip 82. The Corona effect produced by electrical field EF carries the charged fluid particles to the target intended to be coated with the fluid. Retainer ring 86 maintains air cap 84 and tip 82 assembled with gun barrel 30, while seat housing 80 is threaded into gun barrel 30.

Figure 4A:
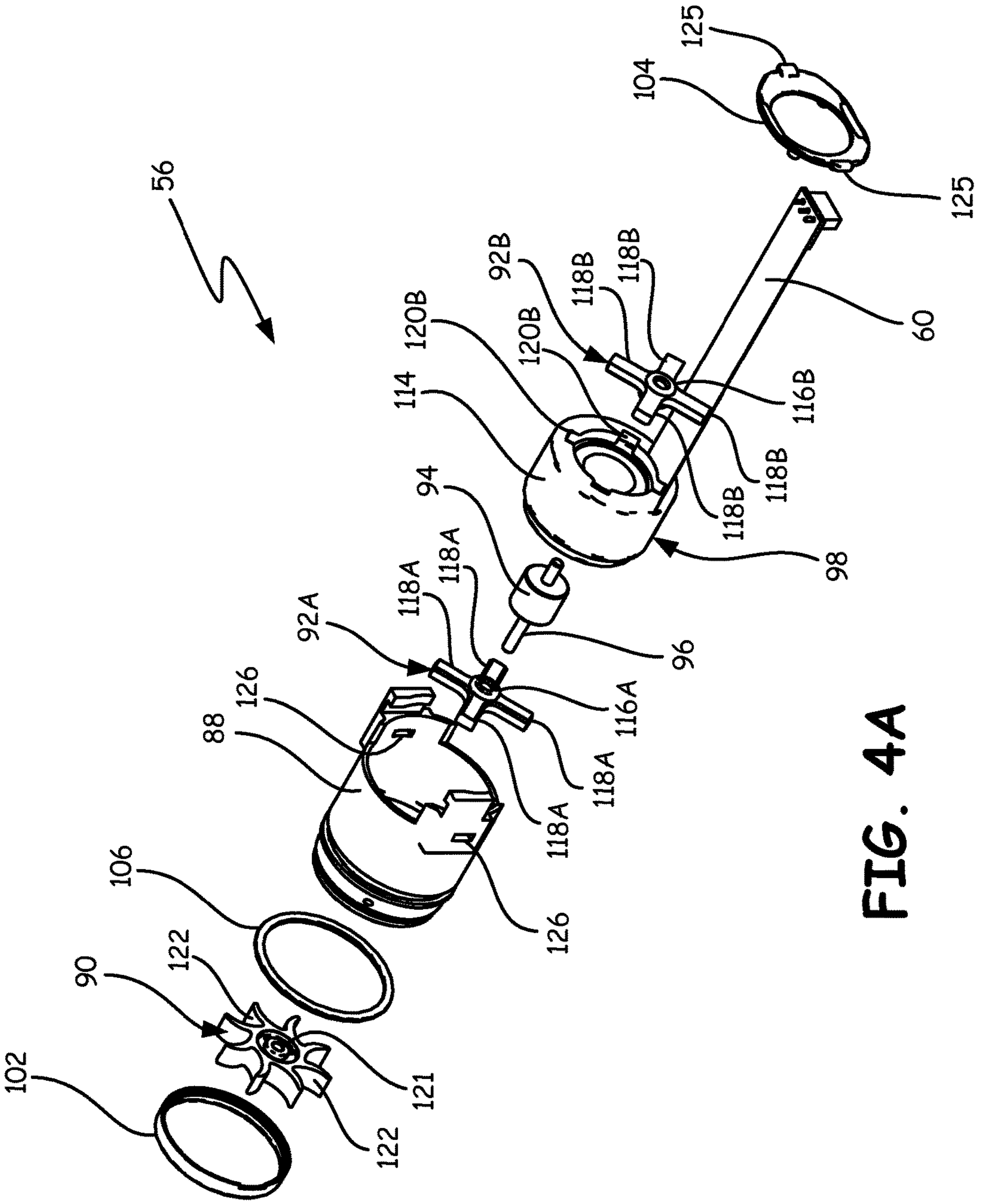
FIG. 4A is an exploded view of the alternator of FIG. 3 showing an impeller and a rotor for mounting within a stator assembly.
Figure 4B:
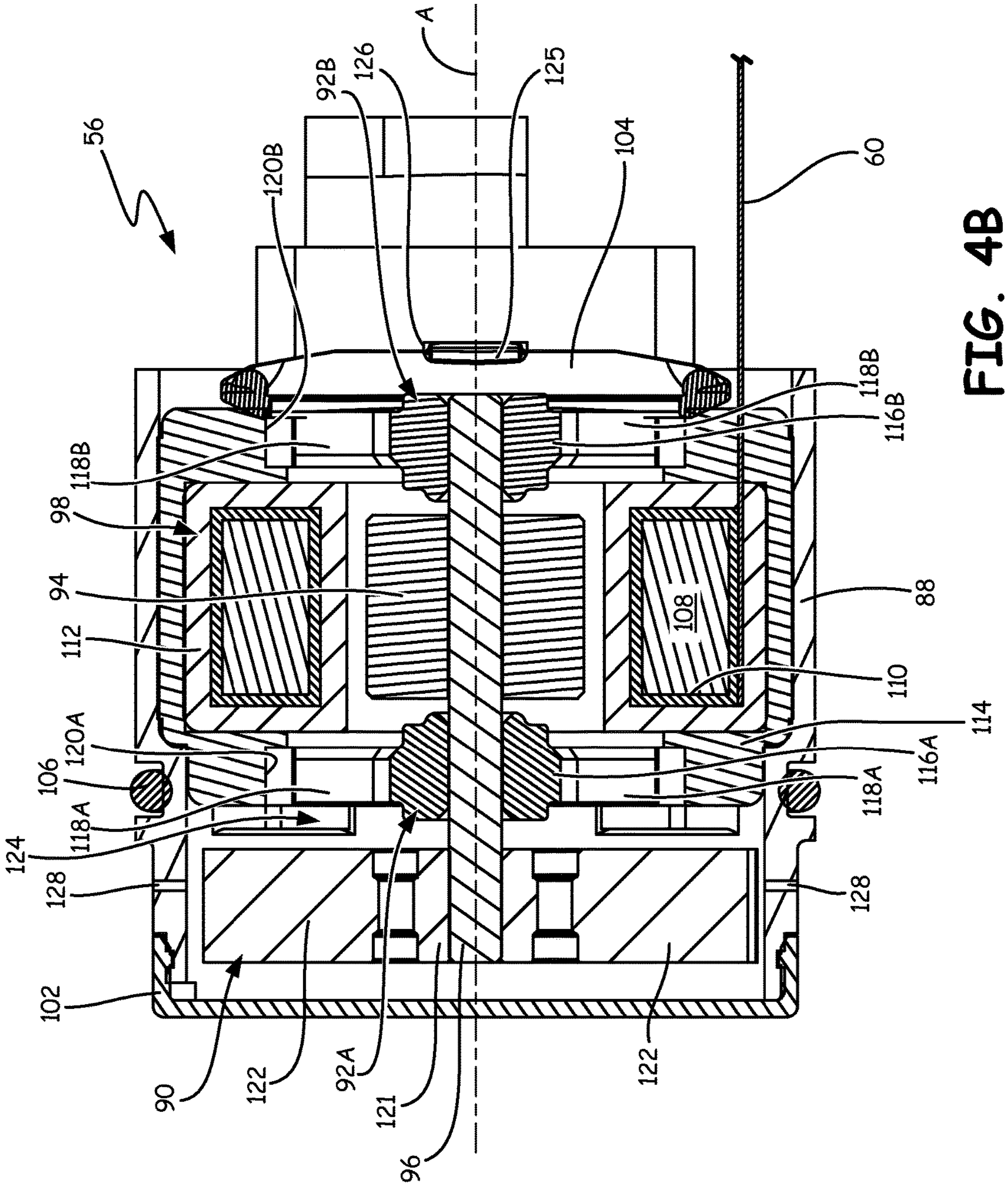
FIG. 4B is a cross-sectional view of the alternator of FIG. 3 showing bearings and an impeller connected to the rotor.

FIG. 4A is an exploded view of alternator 56 of FIG. 3 showing an electromagnetic alternator and an impeller. Specifically, alternator 56 includes housing 88, impeller 90, bearing 92A, bearing 92B, rotor 94, shaft 96, stator assembly 98, ribbon cable 60, end cap 102, retention clip 104 and seal 106. FIG. 4B is a cross-sectional view of alternator 56 of FIG. 3 showing stator assembly 98. Stator assembly 98 comprises stator core 108, windings 110, cover 112 and sheath 114. FIGS. 4A and 4B are discussed concurrently.

End cap 102 is connected to housing 88 to form a canister in which components of alternator 56 are disposed. Shaft 96 extends through an inner bore within rotor 94 such that opposite distal ends extend from rotor 94. Bearings 92A and 92B are fitted onto shaft 96 and linked to sheath 114. Specifically, hubs 116A and 116B are fitted over ends of shaft 96 on opposite sides of rotor 94, while prongs 118A and 118B extend to sheath 114. As can be seen in FIG. 4B, prongs 118A and 118B are anchored within pockets 120A and 120B in sheath 114. In one embodiment of the invention, bearings 92A and 92B comprise oil impregnated sintered bronze bearings. In yet other embodiments, bearings 92A and 92B are covered with a solvent-resistant coating, such as a fluoropolymer. Such coatings for bearings are described in U.S. Pat. No. 7,226,004, which is assigned to Graco Minnesota Inc. Impeller 90 is fitted onto shaft 96 proximate bearing 92A. Specifically, hub 121 is inserted over shaft 96, while blades 122 extend generally radially outward from hub 121 toward housing 88.

Impeller 90, rotor 94 and stator assembly 98 are inserted into housing 88. Sheath 114 of stator assembly 98 is tightly fit, or force fit, into housing 88 to securely hold stator assembly 98 within housing 88. Sheath 114 is pushed against shoulder 124 (FIG. 4B) to properly position impeller 90 with respect to openings 128. Inserted as such, impeller 90 is disposed within a space between stator assembly 98 and end cap 102. Shaft 96 is free to rotate within bearings 92A and 92B so that impeller 90 can rotate within housing 88. Retention clip 104 is inserted into housing 88 and tabs 125 (FIG. 4A) engage notches 126 (FIG. 4A) in housing 88. Retention clip 104 prevents bearing 92B from being dislodged from pockets 120B. Retention clip 104 also assists in retaining stator assembly 98 within housing 88 by pushing stator assembly 98 against shoulder 124.

Compressed air is directed into housing 88 through openings 128 in order to induce rotation of impeller 90. The compressed air impacts blades 122 to induce rotation of impeller 90, which causes shaft 96 and rotor 94 to rotate within windings 110 of stator assembly 98. In the described embodiment, cover 112 comprises an epoxy coating around windings 110. In other embodiments, a coating may be formed around core 108 between windings 110 and core 108. Rotor 94 and windings 110 form an electromagnetic alternator that produces electric current that is provided to ribbon cable 60. In embodiments of the invention, rotor 94 comprises a Neodymium magnet, and windings 110 comprise copper wires. Neodymium magnets have higher energy density than conventional magnets, such as Al-Nico magnets. The higher energy density allows the size and weight of rotor 94 to be reduced. In one embodiment, alternator 56 is reduced in size 40% compared to prior art electrostatic spray gun alternators by the use of Neodymium magnets. The reduced size of rotor 94 lowers the moment of inertia and increases the acceleration of rotor 94 under force of the compressed air, which provides better responsiveness for operator 26 (FIG. 1) and may require less volume of compressed air to operate alternator 56.

As mentioned, blades 122 are positioned to receive air from openings 128 in housing 88. Both the shape and the number of blades 122 are selected to maximize extraction of power from the flow of the compressed air. In particular, blades 122 are spaced around hub 121 so that only a single blade substantially receives compressed air from each opening 128 at a time, and blades 122 are shaped such that compressed air always impacts each blade substantially at a right angle.

Figure 5B:
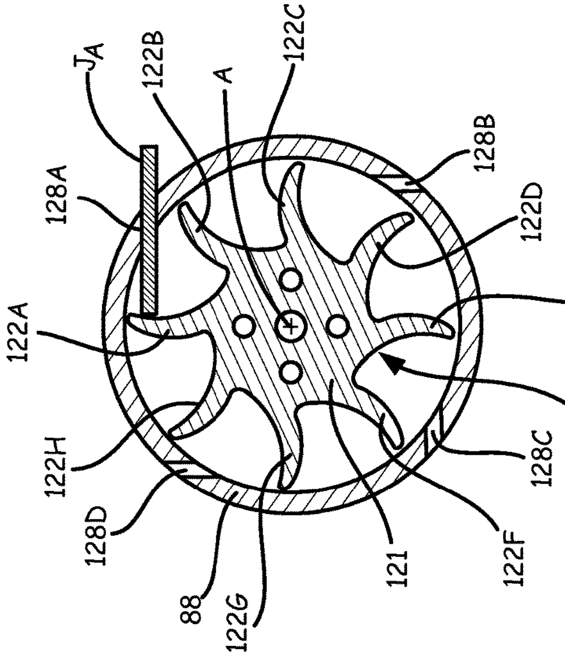
FIGS. 5A-5C show the impeller in various positions relative to an air inlet hole in the housing.
Figure 5C:
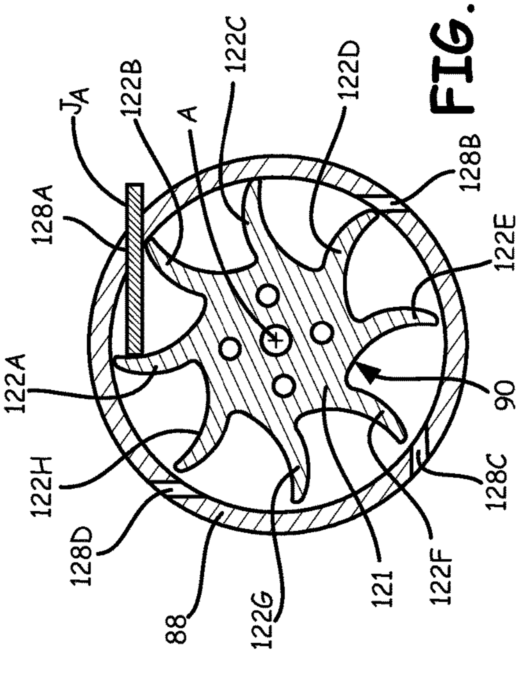
Figure 5A:
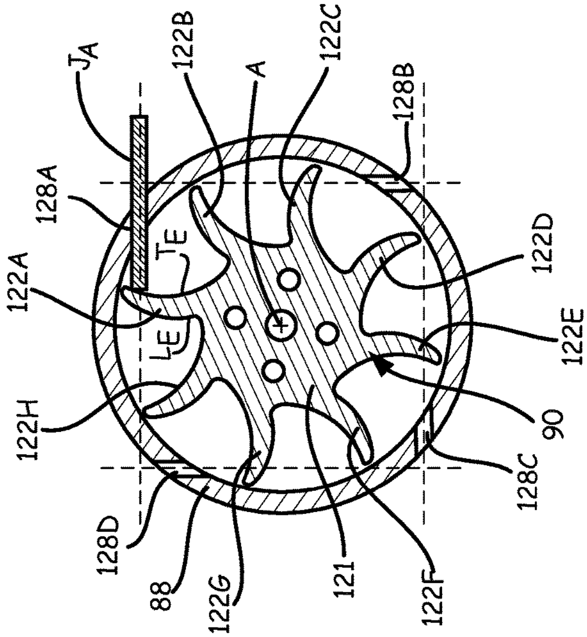

FIGS. 5A-5C show impeller 90 in various positions relative to air inlet holes 128A-128D in housing 88. Impeller 90 includes blades 122A-122H that extend from hub 121. Each of air inlet holes 128A-128D is configured to receive a jet of compressed air from air inlet 38 (FIG. 2). For example, inlet hole 128A is configured to receive air jet $J_A$.

In the described embodiment, impeller 90 includes eight blades 122 and housing 88 includes four inlet openings 128. Blades 122A-122H and inlet openings 128A-128D are spaced such that only four blades are substantially in contact with air jets from inlet openings 128A-128D at all times. Thus, four blades are substantially out of contact with air jets at all times.

Housing 88 forms a substantially cylindrical body that is concentric with axis A. Likewise, hub 121 of impeller 90 is concentrically disposed around axis A. Inlet openings 128 are spaced evenly about housing 88. Thus, inlet openings 128A-128D are spaced approximately ninety degrees apart with reference to axis A. The four inlet openings 128A-128D are disposed relative to each other along axes that intersect to form a rectilinear body centered on axis A. Each of inlet openings 128A-128D extends parallel to a line that bisects housing 88 through axis A. Thus, in the depicted embodiment, the axes of inlet openings 128A-128D form a square shape.

Each of blades 122A-122H is curved. Specifically, each blade 122A-122H includes curved leading edge LE and curved trailing edge TE, as is illustrated with reference to blade 122A. Blades 122A-122H are spaced evenly about hub 121. Thus, blades 122A-122H are spaced approximately forty-five degrees apart with reference to axis A.

The leading edges and trailing edges are shaped to maximize torque generated by air jet $J_A$. Specifically, each trailing edge is shaped so as to always be substantially perpendicular to an air jet. FIG. 5A shows the tip portion of blade 122A coming into contact with air jet $J_A$. As impeller 90 rotates about axis A, the portion of the trailing edge of blade 122A that is in contact with air jet $J_A$ changes. Specifically, air jet $J_A$ impinges slightly closer to hub 121. FIG. 5B shows blade 122A rotated ten degrees further away from inlet opening 128A with reference to axis A, as compared to FIG. 5A. As air jet $J_A$ pushes blade 122A further away from inlet opening 128A, the curvature of TE ensures that blade 122A will always be substantially perpendicular to air jet $J_A$. FIG. 5C shows blade 122A rotated twenty degrees further away from inlet opening 128A with reference to axis A, as compared to FIG. 5A. In some embodiments, air jet $J_A$ impacts trailing edge TE within ten degrees of being perpendicular. In preferred embodiments, air jet $J_A$ impacts trailing edge TE within five degrees of being perpendicular.

Air jet $J_A$ imparts the maximum amount of torque on hub 121 that is available given that air jet $J_A$ impact substantially only one blade at a time and is continuously in contact with a blade at all times. With the impellers of the present disclosure, maximum torque is obtained because impact of the vector of air jet $J_A$ on the lever arm of impeller 90 (the distance between the center axis of the impeller around hub 121 and the area of impact of jet $J_A$ along the blade) is incident as square as permissible based on the location of inlet opening 128A to improve torque (air jet vector*lever arm=torque) at the blade hub. In one embodiment, trailing edge TE of blade 122A extends along an arc that is greater in length than an arc along which the leading edge extends. Leading edge LE of blade 122A is shaped to reduce the size and weight of blade 122A, as the leading edge is not configured to engage air jet $J_A$. The curvatures and lengths of the trailing edges and the leading edges give rise to a shark-fin shape for a leading edge and a trailing edge of adjacent blades.

The impeller blades of the present invention provide more efficient power extraction as compared to prior art alternator blades. Prior art alternator turbines for use with electrostatic spray guns relied on impellers having triangular shaped, or saw-tooth shaped blades, which had flat leading and trailing edges. Thus, the flat surfaces of the impellers produced angles with the air jet that reduced the effectiveness of impingement with the air jet. Specifically, the air jet would impact the surface of the flat blade at an angle less than ninety degrees, such as thirty degrees. Thus, the force of the impingement of the air jet on the blade surface that produces torque at the blade hub became a vector having a magnitude less than the entire force of the air jet, thereby giving rise to inefficient power extraction. The curved impeller blades described herein allow for more energy to be extracted from the compressed air. Specifically, the air jet impacts the impeller surface at approximately ninety degrees in order to maximize the magnitude of the vector producing torque at the blade hub. With the present invention, the air jet vector that is substantially perpendicular to the blade surface (and that produces torque at the blade hub) is approximately equal to the total magnitude of the force of the air jet. More efficient power extraction by impeller 90 allows for consumption of less air to obtain the same power, thereby increasing overall system efficiency.

Although the present invention has been described with reference to preferred embodiments, workers skilled in the art will recognize that changes may be made in form and detail without departing from the spirit and scope of the invention.

The invention claimed is:

1. An alternator assembly comprising:

a housing having four inlet openings extending through the housing;

an alternator disposed in the housing, the alternator comprising a stator surrounding a rotor;

a shaft extending from the rotor; and an impeller comprising:

an annular hub disposed about a hub axis and mounted to the shaft; and eight blades extending from the hub and having curved leading edge and trailing edge surfaces, wherein four blades of the eight blades are in line of sight with the four inlet openings, respectively, at any time, regardless of the circumferential position of the hub with respect to the hub axis, and wherein each blade has a curvature so as to be substantially perpendicular to one of the inlet openings when that blade is in line of sight of that inlet opening.

2. The alternator assembly of claim 1 wherein a leading edge and a trailing edge of adjacent blades form a shark-fin shape.

3. The alternator assembly of claim 1 wherein the inlet opening extends parallel to a line that bisects the housing through the hub axis.

4. The alternator assembly of claim 1 wherein the plurality of inlet openings extend along axes that intersect to form a rectilinear shape centered on the hub axis.

5. The alternator assembly of claim 1 wherein each blade is positioned to have a line of sight of the inlet opening for approximately 45 degrees of rotation of the impeller.

6. The alternator assembly of claim 1 wherein the rotor includes a Neodymium magnet.

7. The alternator assembly of claim 1 and further comprising:

a power supply coupled to the alternator; and an electrode electrically coupled to the power supply.

8. An alternator comprising:

an electromagnetic alternator having a shaft;

a housing in which the electromagnetic generator is disposed, the housing having four air apertures extending through the housing; and an impeller mounted to the shaft within the housing so as to be aligned with the air apertures, wherein the impeller includes eight blades, and wherein four blades of the eight blades are in line of sight with the four air apertures, respectively, at any time, and wherein each blade has curved leading and trailing edges so as to be substantially perpendicular to one of the air apertures when that blade is in line of sight of that air aperture, and each air aperture extends along an axis that has a line of sight of substantially only one impeller blade trailing edge at a time.

9. The alternator of claim 8 wherein each trailing edge is shaped and the air aperture is oriented so that air from the air aperture is configured to impact the trailing edge only at a right angle.

10. The alternator of claim 8 wherein a leading edge and a trailing edge of adjacent impeller blades form a shark-fin shape.

11. The alternator of claim 8 wherein the trailing edge of each blade extends along a curve having a greater length than a curve formed by the leading edge of the same blade.

12. The alternator of claim 8 wherein:

the impeller includes eight blades spaced evenly about an impeller hub; and the housing includes four inlet apertures spaced evenly about the housing.

* * * * *